United States Patent
Pao et al.

(10) Patent No.: US 8,428,389 B2
(45) Date of Patent: Apr. 23, 2013

(54) MULTI-DIMENSIONAL EMPIRICAL MODE DECOMPOSITION (EMD) METHOD FOR IMAGE TEXTURE ANALYSIS

(75) Inventors: Sun-Hua Pao, Taipei (TW); Yio-Wha Shau, Taipei (TW); Ming-Chien Yu, Taipei (TW); Chien-Lun Tseng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 854 days.

(21) Appl. No.: 12/555,158

(22) Filed: Sep. 8, 2009

(65) Prior Publication Data
US 2010/0074496 A1 Mar. 25, 2010

(30) Foreign Application Priority Data
Sep. 23, 2008 (TW) .............................. 97136535 A

(51) Int. Cl.
*G06K 9/36* (2006.01)
(52) U.S. Cl.
USPC .......................................... 382/267; 382/100
(58) Field of Classification Search ........................ None
See application file for complete search history.

(56) References Cited

U.S. PATENT DOCUMENTS

| | | |
|---|---|---|
| 5,983,162 A | 11/1999 | Huang |
| 6,311,130 B1 | 10/2001 | Huang |
| 6,381,559 B1 | 4/2002 | Huang |
| 6,631,325 B1 | 10/2003 | Huang |
| 6,738,734 B1 | 5/2004 | Huang |
| 6,990,436 B1 | 1/2006 | Huang |
| 2002/0186895 A1 | 12/2002 | Gloersen |

FOREIGN PATENT DOCUMENTS
CN 1988395 6/2007

OTHER PUBLICATIONS

Md. Khademul Islam Molla et al., "Analysis of Temperature Change under Global Warming Impact using Empirical Mode Decomposition", Dec. 25, 2005, Intenational Journal of Information Technology, vol. 3 No. 2, pp. 131-139.*
Huang, N.E., et al.; "The Empirical Mode Decomposition and the Hilbert Spectrum for Non-Linear and Non-Stationary Time Series Analysis;" The Royal Society; 1998; pp. 903-995.
Guanlei, X., et al.; "Neighborhood Limited Empirical Mode Decomposition and Application in Image Processing;" Fourth International Conference on Image and Graphics; 2007; pp. 149-154.
Liu, Z., et al.; "Texture Classification Through Directional Empirical Mode Decomposition;" Proceedings of the 17th International Conference on Pattern Recognition; 2004; pp. 1-4.
Nunes, J.C., et al.; "Texture Analysis Based on Local Analysis of the Bidimensional Empirical Mode Decomposition;" Machine Vision and Applications; 2005; pp. 177-188.

(Continued)

*Primary Examiner* — Claire Wang
*Assistant Examiner* — David Perlman
(74) *Attorney, Agent, or Firm* — McClure, Qualey & Rodack, LLP

(57) ABSTRACT

A multi-dimensional empirical mode decomposition method is provided. The method can be applied in image texture analysis, such as medical image analysis. The method can adaptively decompose a three-dimensional image into a number of characteristic image layers and extract characteristic images showing more noticeable textures from the layers. The method uses the physical concept of field to perform the data mode decomposition to obtain envelope and tendency estimation of multi-dimensional data. The method can also be applied in time and frequency analysis of two-dimensional data or multi-channel data.

30 Claims, 10 Drawing Sheets

OTHER PUBLICATIONS

Wu, Z., et al.; "Ensemble Empirical Mode Decomposition: A Noise Assisted Data Analysis Method;" Aug. 2005; pp. 1-51.

Chinese language office action dated Dec. 21, 2011.

English language translation of abstract of CN 1988395 (published Jun. 27, 2007).

Yu, D., et al.; "Signal Empirical Mode Decomposition and Intermittency Frequency;" Journal of Fuzhou University (Natural Science); vol. 33; No. 5; Oct. 2005; pp. 638-642 & 648.

* cited by examiner

MULTI-DIMENSIONAL EMPIRICAL MODE DECOMPOSITION (EMD) METHOD FOR IMAGE TEXTURE ANALYSIS

This application claims the benefit of Taiwan application Serial No. 97136535, filed Sep. 23, 2008, the subject matter of which is incorporated herein by reference.

TECHNICAL FIELD

The invention relates in general to an image analyzing method, and more particularly to a multi-dimensional empirical mode decomposition (EMD) method for image texture analysis.

BACKGROUND

An empirical mode decomposition (EMD) method is proposed by Huang N. E. et al. to perform non-stationary and non-linear signal decomposition. The algorithm of signal decomposition can decompose a time-related signal into superposition of a limited number of intrinsic mode functions (IMF) and monotonic functions. Nowadays, there have existed a large number of documents verifying the signal analysis ability of one-dimensional empirical mode decomposition. The two-dimensional empirical mode decomposition has also been applied in image processing, such as image texture analysis, image edge detection and a minority of medical image applications.

After the year of 2000, the two-dimensional empirical mode decomposition is applied to picture processing. The two-dimensional empirical mode has only slight difference from the one-dimensional empirical mode in mathematical theory. Basically, the empirical mode decomposition obtains characteristic waveforms by many times of squeezing with envelope lines of the maximum and minimum values of signals. When applied in the two-dimensional empirical mode, a more complicated envelope surface is used instead of the use of simple envelope lines.

The envelope surface used in the two-dimensional empirical mode is formed by image grids, or by auxiliary of the optimal numerical interpolation. However, the present academic-applied two-dimensional empirical mode decomposition has the following three essential problems to be solved.

First, the maximum and minimum values of a two-dimensional image are difficult to define (such as a saddle-shape problem). Second, the present two-dimensional empirical mode based on continuous data would probably lead to inaccuracy due to the discrete and discontinuous nature of images. Third, the concept of an envelope surface cannot be extended to three or more than three dimensional empirical mode.

Regarding the definition of extrema, the extrema of a signal includes maxima and minima. In addition to the conventional definition using signal intensity, the signal curvature is used to define extrema of the signal. However, in the prior-art technology, no discussion is provided about the definition of signal extrema in the case that the signal has the dimension more than one. Further, the signal has usually two, or three, or even four dimensions in the practical applications, such as ultrasonic images, CT images and 4D-ultrasonic images.

The empirical mode decomposition is implemented by a number of iterations in a sifting procedure. An important process in the sifting procedure is the construction of envelope functions. When the data to be analyzed is one-dimensional, the well-known methods of envelope-function construction include a cubic spline fitting method disclosed in U.S. Pat. No. 5,983,162, and a straight-line fitting method disclosed in U.S. Pat. No. 6,990,436, for instance.

When the data to be analyzed is two-dimensional, the well-known envelope-function construction methods include U.S. Pat. No. 6,311,130 proposed by Huang N. E. in which two-dimensional signal is regarded as a combination of one-dimensional signals, the empirical mode decomposition is used to decompose the one-dimensional signals and the decomposed signals are then combined into two-dimensional intrinsic mode functions. Y. Xu et al. employ triangular grids to construct the required envelope surface in the sifting procedure. Nunes J. C. et al. adopt radial basis function interpolation to accomplish the envelope-plane construction. The method of using grids obtains better results but is not applicable to three-dimensional empirical mode analysis. Theoretically, the interpolation method can be applied to three-dimensional applications, but has a poor continuality on space differential. Besides, a researcher Per Cloersen has proposed US Patent No. 2002/0186895, which analyzes the fluctuation of the empirical mode analysis along with time axis. In spite of the above prior-art disclosures, there is still no method for analyzing a three-dimensional empirical mode at present.

Therefore, owing that the present image-analysis application, such as medical image analysis or other application and scientific research have entered a three-dimensional field, the prior-art technology is insufficient for the requirement in the three-dimensional data analysis. For this reason, it becomes a topic to develop an algorithm of three or more than three dimensional empirical mode decomposition.

BRIEF SUMMARY

Embodiments of a multi-dimensional empirical mode decomposition method are disclosed. The method can be applied in image texture analysis, such as medical image analysis. The method can adaptively decompose multi-dimensional data into a number of characteristic data functions, that is, perform data mode decomposition for analysis application. The data mode decomposition is achieved by using the physical concept of "field" in physics, which can be extended to obtain tendency estimation and envelope values of multi-dimensional data. For example, after the three-dimensional image is decomposed into a number of characteristic image layers, a number of characteristic images are extracted by using equations of a physical field to show different texture analysis images for further analysis application. Owing that data mode decomposition applies the field concept in physics, the above method can be applied to time and frequency analysis of two-dimensional data or multi-channel data and can be extended to three and more than three dimensional data mode decomposition.

An exemplary embodiment of a method for processing multi-dimensional data by empirical mode decomposition (EMD) is provided. The method includes following steps. A first set of multi-dimensional data is read. Sifting the first set of multi-dimensional data by iteration to obtain at least an intrinsic mode function via the empirical mode decomposition is performed. Each iteration process when performing the sifting step to obtain the intrinsic mode function includes: mapping each value of the first set of the multi-dimensional data to a physical quantity of a physical field to obtain a plurality of numerical values of the physical quantity of the physical field, wherein the physical quantity has the same dimension as the first set of multi-dimensional data; determining an average envelope of a distribution of the numerical values of the physical quantity according to a varying relationship of the physical field with respect to the physical quantity of the physical field; determining a next set of multi-dimensional data according to the first set of multi-dimensional data and the average envelope; and performing a next iteration process starting with the mapping step with respect to the next set of multi-dimensional data.

An exemplary embodiment of a method for processing multi-dimensional image data by empirical mode decomposition applied for image texture analysis is provided. The method includes following steps. (a) A first set of multi-dimensional image data is read. (b) Sifting the first set of multi-dimensional image data by iteration to obtain a plurality of intrinsic mode functions via the empirical mode decomposition is performed. (c) Transforming the intrinsic mode functions to be a plurality of multi-dimensional images and outputting the multi-dimensional images for the image texture analysis are performed. Each iteration process when performing the sifting step to obtain one of the intrinsic mode functions includes: mapping each value of the first set of the multi-dimensional data to a physical quantity of a physical field to obtain a plurality of numerical values of the physical quantity of the physical field, wherein the physical quantity has the same dimension as the first set of multi-dimensional image data and is a function of time; determining an average envelope of distribution of the numerical values of the physical quantity according to a varying relationship of the physical field with respect to the physical quantity of the physical field; determining a next set of multi-dimensional image data according to the first set of multi-dimensional image data and the average envelope; and performing a next iteration process beginning with the mapping step with respect to the next set of multi-dimensional image data.

It is to be understood that both the foregoing general description and the following detailed description are exemplary and explanatory only and are not restrictive of the disclosed embodiments, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
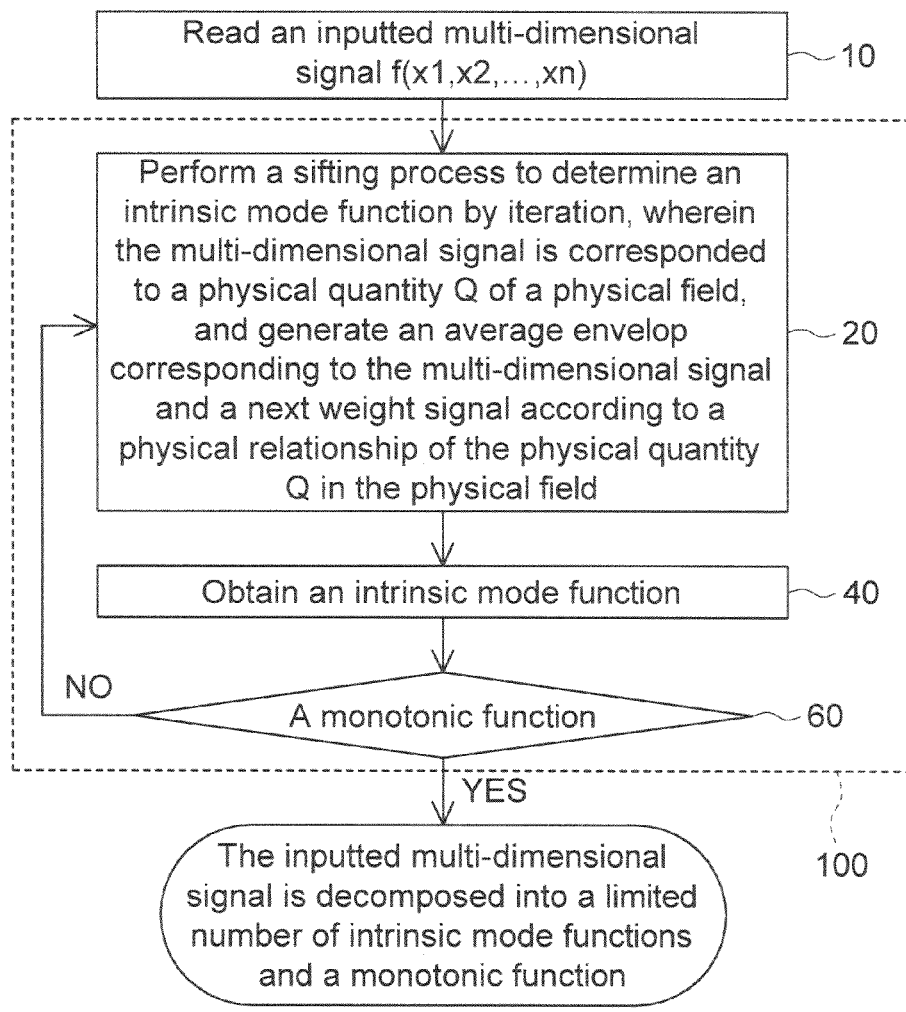
FIG. 1 is a flow chart of a multi-dimensional empirical mode decomposition (EMD) method according to a first exemplary embodiment.
Figure 2:
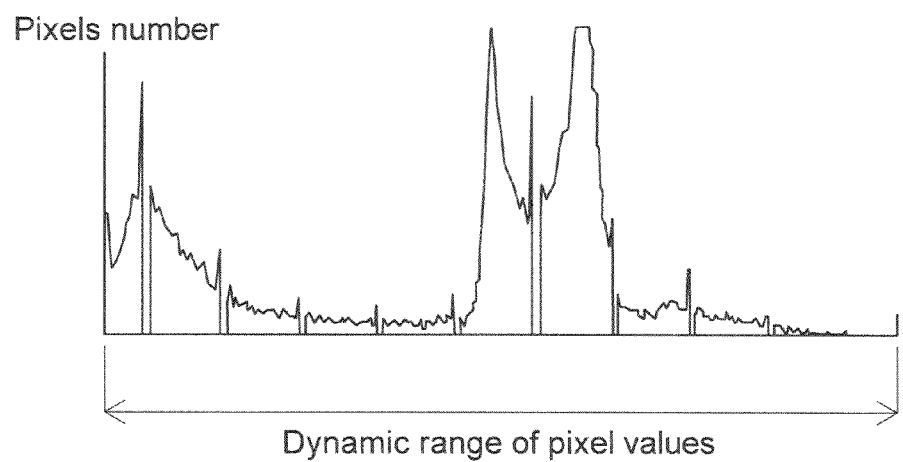
FIG. 2 is a diagram of a dynamic range distribution of an original image.

FIG. 1 is a flow chart of a multi-dimensional empirical mode decomposition (EMD) method 100 according to a first exemplary embodiment. A number of inputted datasets are regarded as a multi-dimensional signal $f(x_1, x_2, \ldots, x_n)$, i.e. a multi-variable function. For example, a three-dimensional image is represented by $f(x,y,z)$. In the sifting process by iteration, the inputted multi-dimensional signal $f(x_1, x_2, \ldots, x_n)$ is decomposed into superposition of a limited number of intrinsic mode functions (IMF) and monotonic functions as the following:

$$f(t)=\Sigma_{i=1}^{n-1}imf_i(t)+r_n(t), \text{ wherein } imf_i(t) \text{ and } r_n(t)$$
respectively represent the intrinsic mode functions and monotonic function.

The multi-dimensional empirical mode decomposition method 100 includes a sifting step 20 to obtain an intrinsic mode function by iteration. The sifting step 20 uses the concept of "field" in physics, such as a physical quantity Q as a function of a n-dimensional variable and time t:

$$Q=g(x_1, x_2, \ldots, x_n, t),$$

That is, a number of datasets $f(x_1, x_2, \ldots, x_n)$ are mapped into the function $g(x_1, x_2, \ldots, x_n, t)$ of the same-dimensional physical quantity Q in physics, and the envelope estimation is performed according to a varying relationship of the physical field with respect to the physical quantity Q to determine an average "envelope". For example, an "envelope" of local maxima and an "envelope" of local minima of the multi-dimensional signal are determined for obtaining the average "envelope". Then, a component signal is obtained according to the multi-dimensional signal and the average "envelope" for the next iteration. For example, the average "envelope" is subtracted from the multi-dimensional signal to obtain a component signal $h_1$ and the same method in the step 20 is used to obtain an average envelope of the component signal $h_1$ and the next component signal $h_{11}$. The iteration process is performed until the following component signal or the average envelope finally satisfies a stop criterion, such as the average envelope is almost vanishing, the finally-obtained component signal $h_{1j}$ is regarded as a corresponding intrinsic mode function, as shown in step 40. Following that, in step 60, a determination as to whether the currently-obtained intrinsic mode function represents a monotonic function is made. If so, it represents the inputted multi-dimensional signal $f(x_1, x_2, \ldots, x_n)$ has been decomposed into a limited number of intrinsic mode functions and a monotonic function. If not, the intrinsic mode function $h_{1j}$ is subtracted from the multi-dimensional signal to obtain another multi-dimensional signal, and then the step 20 is performed again. In this way, the next iteration process is performed from steps 20 to 60 until the inputted multi-dimensional signal is decomposed into a limited number of intrinsic mode functions and monotonic function.

The multi-dimensional empirical mode decomposition method disclosed by the above embodiment employs a field theorem or physical law of a physical field with respect to a physical quantity to obtain an average envelope and accordingly determines an intrinsic mode function. Since the field concept can be extended to multiple dimensions, the requirement of intrinsic-mode function decomposition performed on multi-dimensional datasets, such as the three-dimensional image data, or even data with larger dimensions, can be fulfilled for different applications. For example, in the practical requirement of medical image analysis, the three-dimensional image can be adaptively decomposed into a number of intrinsic mode functions by applying the above method, the intrinsic mode functions are then transformed into a number of characteristic image layers. Thus, texture images with more noticeable characteristics than the original image can be generated based on the characteristic image layers.

Moreover, the embodiment applies the concept of field in physics to correlate the mathematic decomposition of empirical mode with physics, which includes correlating the inputted data with a physical quantity of a physical field. Various concepts of "field" in physics, such as a thermal field, an electromagnetic field, can also be applied in decomposition of empirical mode function. When the multi-dimensional data is a physical quantity coming from a different physical phenomenon, such as a physical quantity of sea-wave, shaking, air-pressure, moisture, electromagnetic or thermal fluctuation, the empirical mode decomposition can adopt a different field to determine the interpolating values and envelopes. In other examples, a physical "field" can be employed for obtaining envelopes according to the physical description of the physical quantities, thus leading to mode decomposition corresponding to reality of the physical phenomenon.

The application of the field concept in physics is suitable with regard to the inputted datasets with a larger dynamic range. For example, FIG. 1 is a histogram of an original image representing fluctuation of a dynamic range of pixel values. The pixel values vary from 0 to 255. For example, the distribution of the pixel values can be regarded as a temperature distribution in a thermal field, and thus a thermal-field equation can be applied to determine an average envelope of the inputted dataset.

In the following description, a second exemplary embodiment is provided by applying the thermal field to the image mode decomposition. It is noted that the concept of "envelope" in the embodiment can be applied to three to more than four dimensional datasets. Since the four and more than four dimensional envelope cannot be illustrated by three-dimensional drawings, the following embodiments are illustrated for the sake of explanation by using three-dimensional datasets and envelope surfaces. Likewise, the examples of the three-dimensional cases can be extended to obtain the four and more than four dimensional application.

Figure 5:
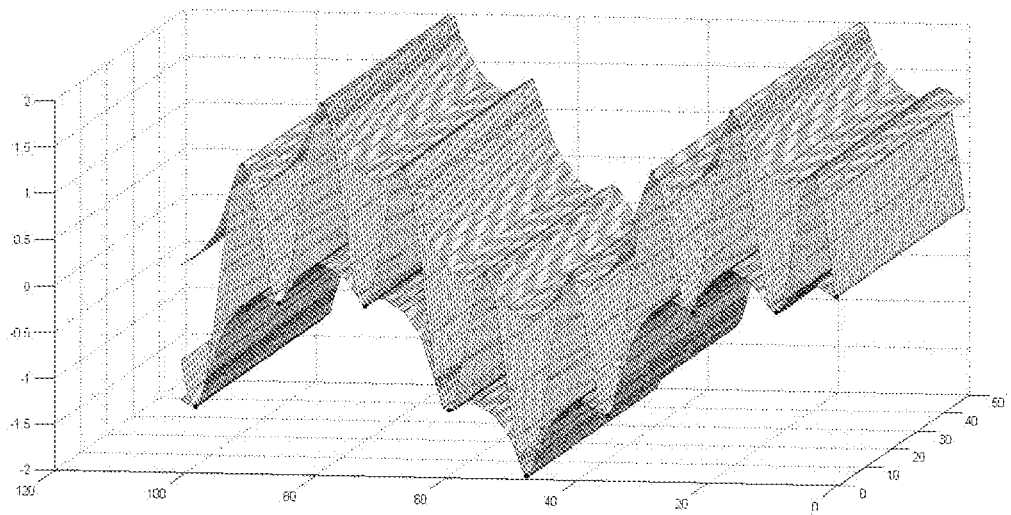
FIG. 5 is a schematic diagram of an upper envelope and a lower envelope of a data distribution.
Figure 6:
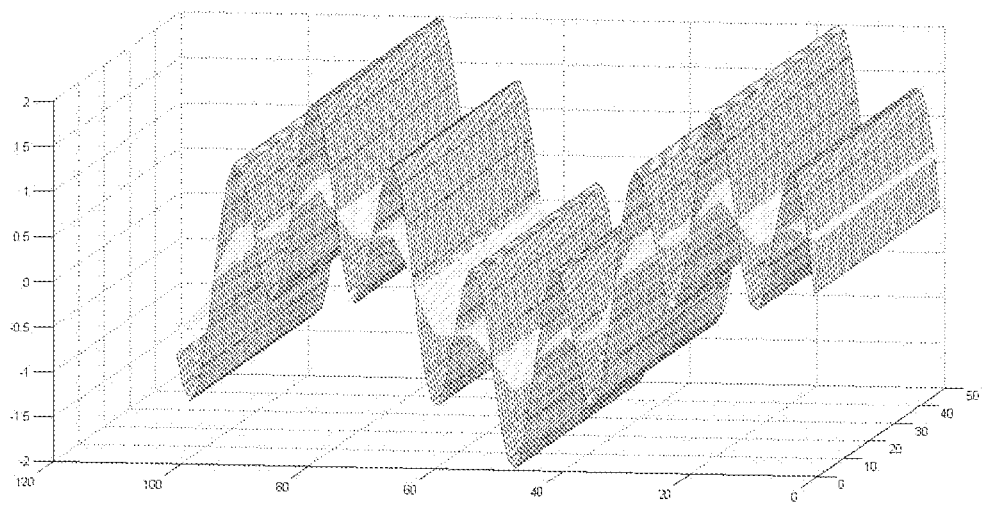
FIG. 6 is a schematic diagram of an average envelope of the data distribution in FIG. 5.

Before illustration of the embodiment, it is basically supposed: all data distributions are set up by carrier waves. That is, any data can be decomposed into a first carrier wave carrying a signal. This signal, after being extracted, can be regarded as a second carrier wave with a signal carried thereon. The calculation is repeated until no carrier wave can be found to carry the finally-extracted signal, and the finally-extracted signal is the mode to be found. The method for looking for the carrier wave is to find a tendency of data distribution, that is, to determine the above average "envelope". The distribution of inputted data, for example, in three-dimensional space can be regarded as a curved surface. An upper envelope of the curved surface can be obtained according to the local maxima of the inputted data while a lower envelope of the curved surface can be obtained according to the local minima of the inputted data, as illustrated by FIG. 5. An average envelope of the upper envelope and the lower envelope, as shown in FIG. 6, can then be obtained, which is a distribution tendency of the inputted data or called a carrier wave. The data mode is the original data, i.e. the curved surface, minus the average envelope. The obtained data mode has to be verified as required by the above steps until the average envelope is close to a horizontal line (i.e., no carrier wave).

Figure 3:
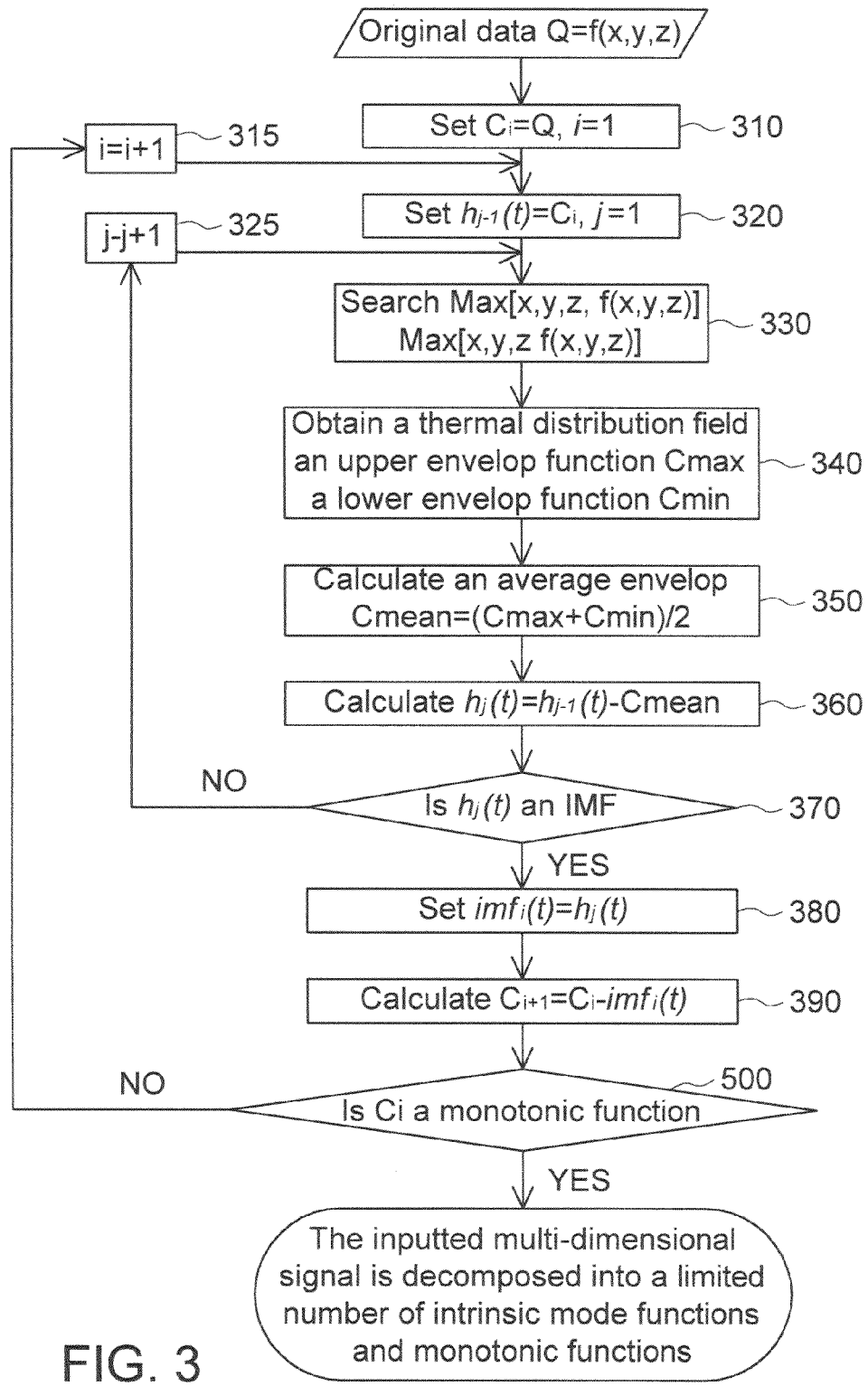
FIG. 3 is a flow chart of an example of the image mode decomposition method applied to a thermal field.

Referring to FIG. 3 first, a flow chart of an example of the image mode decomposition method applied to a thermal field is shown. The steps 810 to 870 are a sifting process by iteration to determine an intrinsic mode function from a number of given (inputted) datasets, the datasets are three-dimensional image data Q=f(x, y, z) for example. The steps 810 and 820 are set to prepare for the sifting process performed by iteration. In the first-time calculation, firstly, $C_i$ is set to be Q, $h_{j-1}(t)=C_i$, wherein j=1, i=1. Then, the values of i and j are increased progressively along with the process of iteration as shown in steps 815 and 825. These setting steps are used for calculation of iteration. The ordinary ones skilled in the related field would realize another method or step sequence different from that of FIG. 3 can be also used. Besides, with regard to calculation of intrinsic mode function, in the prior-art technology, an average envelope line can be obtained from one-dimensional data and an average envelope surface can be obtained from two-dimensional data. However, the envelope surface cannot be established from three and more than three-dimensional data by a mathematical method. The steps 830, 840 and 850 of the embodiment apply the above "field" concept in physics, such as a thermal field, to obtain the corresponding envelope.

Figure 7:
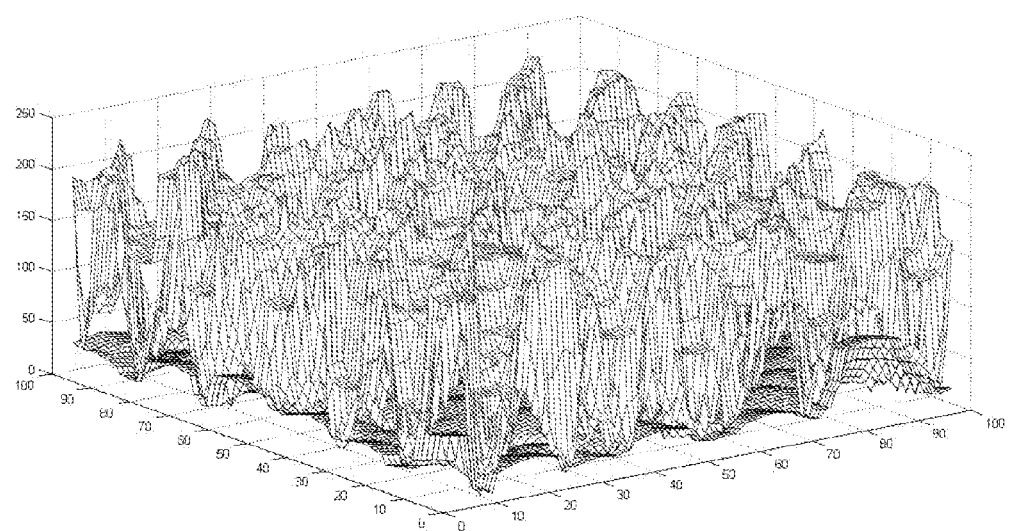
FIG. 7 is a cross-sectional diagram of a three-dimensional structure.

When i=1, $C_i$ is the given three-dimensional data Q=f(x, y, z), and the possible positions of local maxima and their values, denoted by max[x,y,z, f(x,y,z)], and the positions of local minima and their values, denoted by min [x,y,z, f(x,y,z)] are searched in step 830. FIG. 7 is a cross-sectional diagram of a three-dimensional structure. The so-called maximum means the data at that point is higher than the adjacent values and the minimum means the data at that point is lower than the adjacent values.

Figure 8:
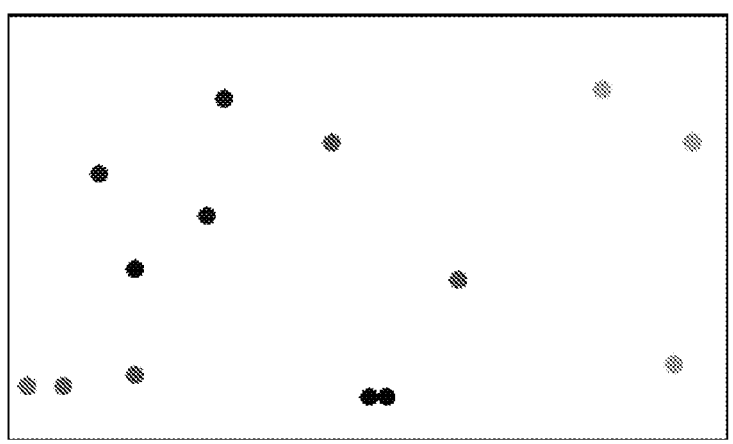
FIG. 8 is a schematic diagram of the maxima found in the data.
Figure 9:
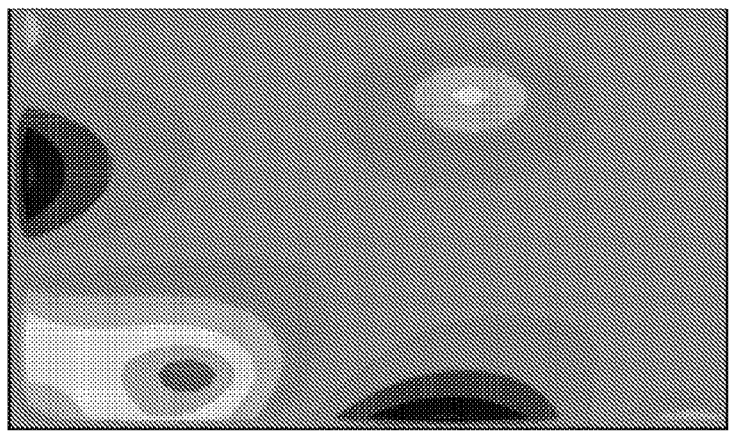
FIG. 9 is a schematic diagram of temperature distribution of the whole field estimated by a number of points in FIG. 8 via thermodynamics.

In step 840, setting up a three-dimensional thermal field is taken for example to transform the positions of extrema and the value of data f(x,y,z), such as linearly transform to temperature U(x,y,z), wherein the pixel luminance 128 can be regarded as 128° C., as shown in FIG. 8 and 9. After the above operation, the original data is mapped to the physical quantity, that is, the temperature. The envelope estimation can be performed via the limited maximum and minimum "temperatures" according to the thermodynamics, that is, by applying a varying relationship of a physical quantity. The so-called envelope is a thermal-field distribution satisfying a thermal-field governing equation:

$$Ut=\alpha(Uxx+Uyy+Uzz)$$

For example, in the method for calculating thermal distribution by differential equation, firstly, the found maxima are put into a mathematic matrix calculation as the initial condition. Their boundary condition for the equation is derived from linear interpolation of known maxima matrix. FIG. 8 is a schematic diagram of the local maxima found in the data including a number of given points and temperatures. The thermodynamics is used to calculate the field of temperature distribution at each position as shown in FIG. 9 from the existing information of FIG. 8. Here, a textbook thermodynamics numerical algorithm, a finite difference method, is used to perform iteration until the temperature stabilizes to be convergent. Further, solution can be obtained from a matrix by using a stationary thermodynamics equation to quickly obtain the distribution of a thermal field.

Secondly, through analysis of a numerical method accordingly, the temperature at each position can be obtained, as shown by the distribution of FIG. 7. Therefore, the temperature at each position can be restored into image values, for example, 50° C. is transformed into an image luminance 50. All the image values obtained after transformation form an upper envelope of the maxima of the image. In the same way, the lower envelope can be calculated by the minima of the image. Finally, as shown in FIG. 7, the thermal-field distribution Cmax of maxima max[x,y,z,f(x,y,z)] is an upper envelope located on the thermal-field distribution curved surface while the thermal-field distribution Cmin of minima min[x,y,z,f(x,y,z)] is a lower envelope.

Figure 10:
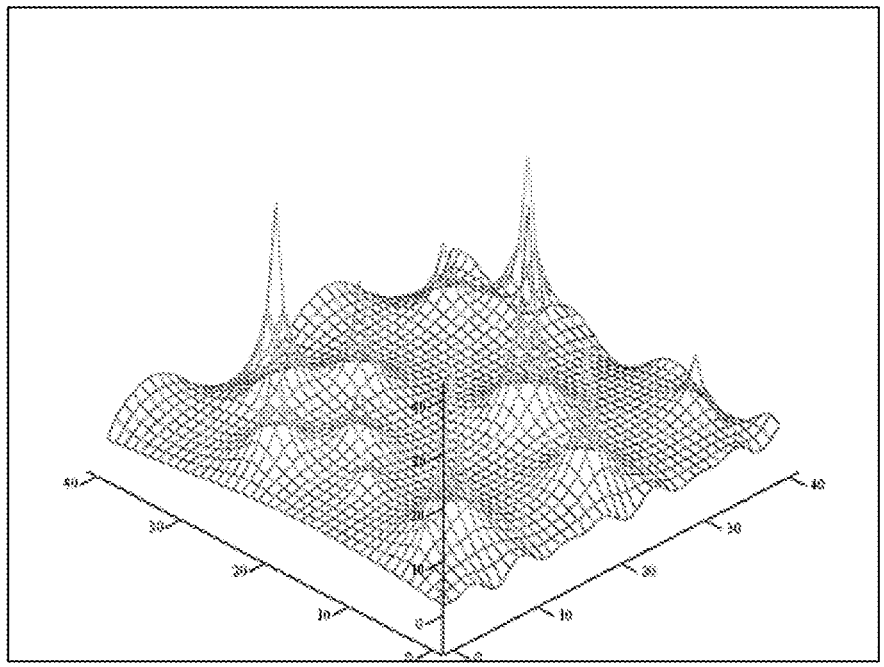
FIG. 10 is a schematic diagram of an envelope function transformed from a thermal field.
Figure 11:
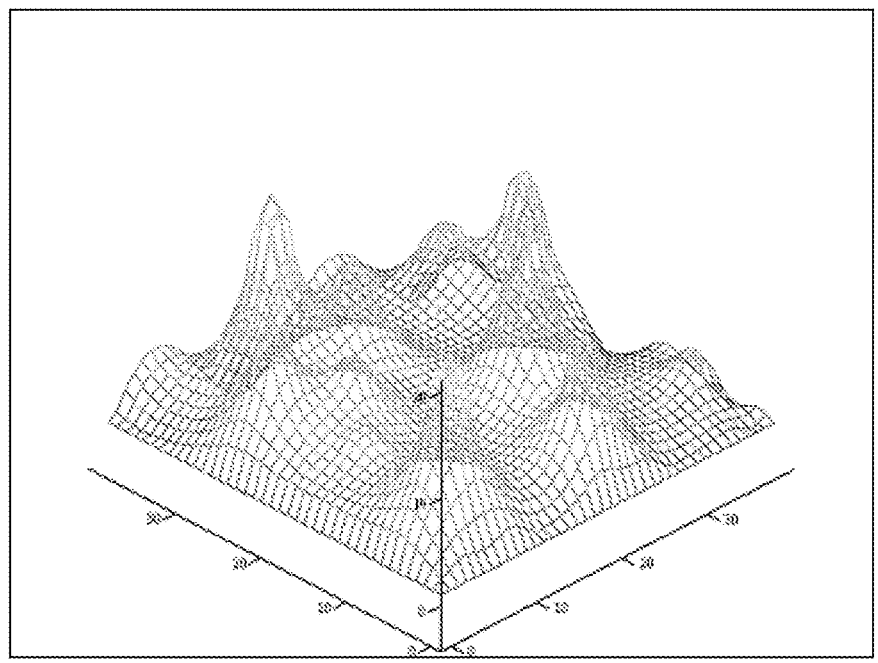
FIG. 11 shows a smoothing result of the envelope function transformed from the thermal field in FIG. 10.

Following that, in step 850, the average envelope is calculated, that is, an average Cmean=(Cmax+Cmin)/2 of the upper envelope and the lower envelope. After the temperature distribution in all the thermal field is obtained, all the temperatures are transformed into values of data, as shown in FIG. 10. After smoothing, the envelope function becomes differentiable, as shown in FIG. 11. Suitable smoothed envelope is helpful for preventing from pollution of the gray spots in decomposition.

Figure 12:
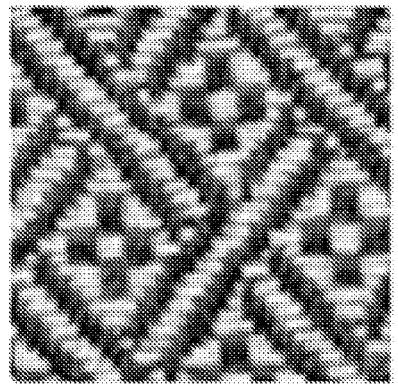
FIGS. 12-15 respectively show an original image and the images corresponding to high-frequency, medium-frequency and low-frequency empirical mode.
Figure 13:
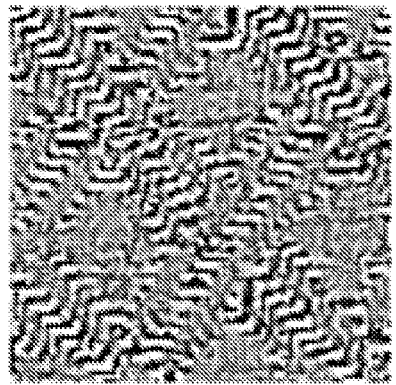
Figure 14:
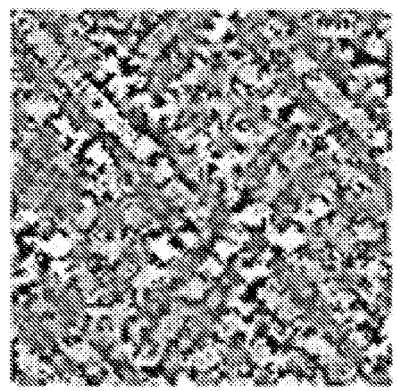
Figure 15:
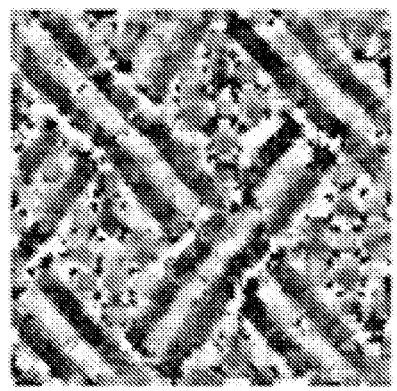

In order to verify the ability of the empirical mode in image decomposition, a simply grid image is used for illustration: The original image includes rough and fine grids, as shown in FIG. 12. After empirical mode decomposition, an empirical mode with high frequencies decomposes the original image into a decomposition diagram including only fine grids, as shown in FIG. 13. The final empirical mode provides decomposition diagrams of the second lowest frequencies and the lowest frequencies, as shown in FIG. 14 and FIG. 15.

The extraction of empirical mode is accomplished step by step in FIG. 3. A set of original three-dimensional image data are decomposed into i empirical modes (including a monotonic function). The calculation of each empirical mode requires repeating iteration j times for checking whether the carrier wave is a horizontal line. In this process, the step 870 is used to determine whether the present component signal $h_j(t)$ is an intrinsic mode function. A number of determination methods can be applied. For example, whether the present component signal $h_j(t)$ or average envelope Cmean satisfies a condition is used to determine whether the average envelope is close to a horizontal line. Or whether the fluctuation of the average envelope is small enough, i.e. lower than a threshold value, is used to determine whether the component signal $h_j(t)$ can be regarded as an intrinsic mode function. In addition, whether a number of following continuous component signals are substantially the same can be used for determination.

Moreover, in terms of corresponding the inputted data with a physical quantity of a physical field, in one example, the divergent points generated after extrema searching from actual values of an image are linearly transformed into a physical scalar (such as intensity, density or temperature) of a physical field and the whole field (corresponding to the inputted data) is put into calculation. The calculated scalars are linearly transformed back to the image values to obtain a multi-dimensional envelope. In another example, the divergent points generated after extrema searching from actual values of an image are linearly transformed into a physical vector and the whole field is used to calculate an equipotential plane and gradients. The calculated equipotential plane is processed by interpolation to obtain the multi-dimensional envelope.

According to the above method for obtaining the envelope by applying a "physical field" such as a thermal field, the one, two, three and more than three dimensional envelope can be obtained by the same mathematic method and the same equations, which avoids the prior-art envelope issues. The boundary conditions in the field calculation can be processed by numerical interpolation.

The above embodiments illustrate that the intrinsic mode function decomposition can be performed on multi-dimensional datasets, such as three-dimensional image data or even higher dimensional datasets, by using the field concept, and the method can be applied in different applications, such as analyzing image difference and characteristics from viewpoint of an empirical mode image and making diagnosis accordingly.

In the following description, medical image processing is exemplified to illustrate the actual requirement of medical image analysis. By using the above method, the three-dimensional image can be adaptively decomposed into a number of intrinsic mode functions, and then the intrinsic mode functions are transformed into a number of characteristic image layers to accordingly generate a texture image having a more obvious feature than the original image.

Sometimes, a tumor shows a clear disease edge in image inspection. However, sometimes when a tumor shows an infiltrating growth, it causes an unclear edge and this kind of tumor is called infiltrating tumor which cannot be cured as easily as a general tumor.

Although many researchers have kept finding effective image characteristics or increasing image intensity via ultrasonic image and tomography scan such that an experienced doctor can estimate an infiltrating extent and classification of the tumor from the image, an accurate diagnosis cannot still be done for more serious cases. Besides, there exist important features inside the tumor, such as a hyperechoic area, hypoechoic area, heterogeneity, micro calcification and fibrosis, which are all related to a malignance of the tumor.

The two-dimensional image is scanned by a hospital technician and thus has individual variation in slice selection, which cannot be used as a golden standard procedure in massive screening and testing or a health-examination field. Therefore, it needs to develop and capture three-dimensional images as auxiliary for diagnosis. At the same time, the image processing technology needs to perform higher-dimensional calculation by following the standard. The edge detection of a tumor image is normally a complicated calculation procedure. In the past, the adopted methods of statistics, spectrum and classification all have limitations owing that very few algorithms can be adaptively used in image analysis without artificial condition setting.

In order to perform analysis on a higher dimensional tumor image, especially an ultrasonic image coming from image background and easily disturbed, development of higher dimensional (at least three-dimensional) adaptive image processing technology is required. The empirical mode analysis can be extended to higher dimensional (more than three-dimensional) image analysis, which meets the present medical new-generation image standard.

Since the adaptive processing method is applicable to processing of the images inevitably having background noise and external interference, such as ultrasonic medical images, a third exemplary embodiment is directed to a multi-dimensional image mode decomposition method. The method includes at least the following steps. First, an image preprocessing standard process is provided. The multi-dimensional (at least more than two-dimensional) envelope calculation is required in mode decomposition. Finally, after mode decomposition, an image in each layer is shown for texture analysis. Calculation or other image processing can be selectively performed on each layer as auxiliary for texture analysis.

As applying in analysis of tumor images, the embodiment can be applied in analysis of characteristics including heterogeneity, micro calcification and fibrosis. In texture analysis of a tumor image, auxiliary diagnosis of tumor edge can be strengthened by using the high-frequency layer (the detailed part) obtained after the mode analysis of the first or second embodiment to perform modification (superposition is the most simply example) of the original image.

Figure 16:
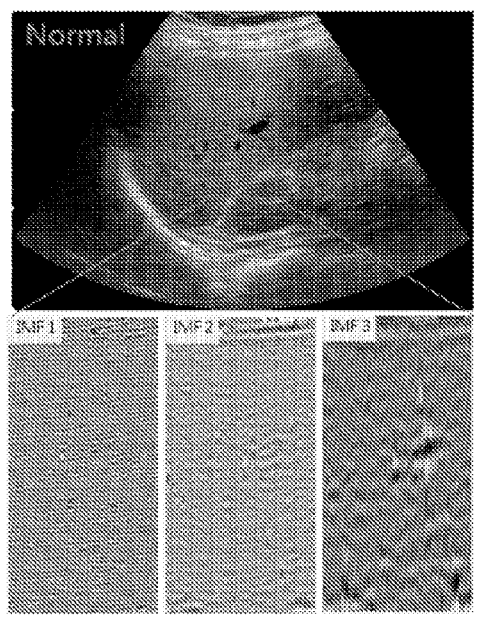
FIG. 16 shows a normal liver ultrasonic image and the layers corresponding to the intrinsic mode functions IMF1~IMF3 thereof.
Figure 17:
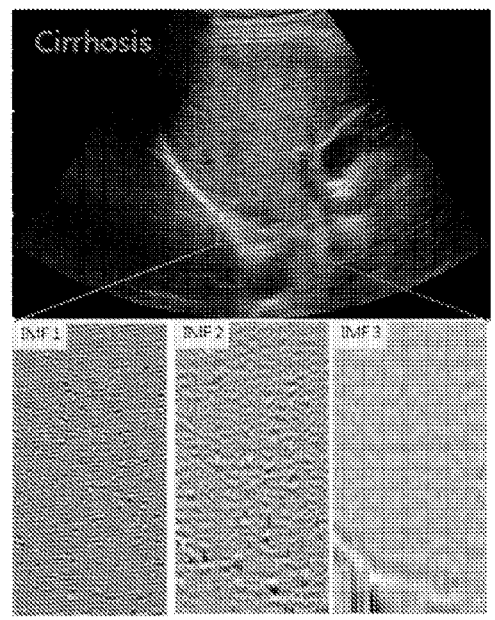
FIG. 17 shows a cirrhosis liver ultrasonic image and the layers corresponding to the intrinsic mode functions IMF1~IMF3 thereof.

The high-frequency layer can be used to perform texture entropy analysis of the tumor to estimate liver fibrosis. As an example of an ultrasonic liver fibrosis image, the ultrasonic image with more obvious fibrosis shows more granular and uneven textures. In the past, the phenomena are easily influenced by the signal decay due to scan depth and penetrating different tissues, which causes the texture analysis to be less objective. As another example of the ultrasonic medical image, the empirical mode decomposition performed on an original ultrasonic liver-fibrosis slice image can compare the difference between the normal and abnormal tissues, especially the difference between the images corresponding to the second-layer (IMF2) and third-layer (IMF3) empirical modes, as shown in FIG. 16 and 17.

The entropy of the layer IMF3 has better ability ($p<0.005$, $CV<10\%$) of describing texture characteristics of liver cirrhosis, and thus the empirical mode decomposition is effective in texture analysis of a liver-cirrhosis ultrasonic image. In the past, the ultrasonic images obtained by a medical professional via naked eyes can only be used to diagnose the ill-fallen or serious liver-cancer patients. If a partial empirical mode analysis can be adopted on the original image to perform a standard image-entropy quantization, screening and testing and long-term tracking can be exactly done at the beginning of liver cancer or even earlier at the beginning of liver cirrhosis.

Figure 18:
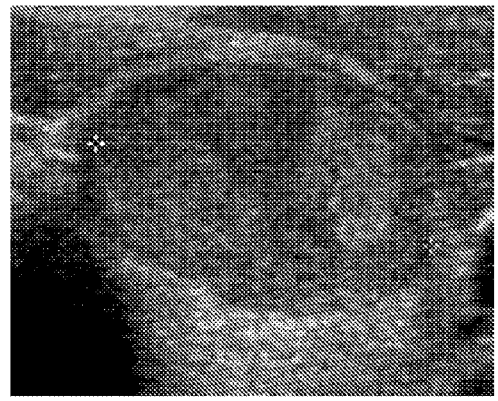
FIG. 18 is an ultrasonic image of a tumor.
Figure 19:
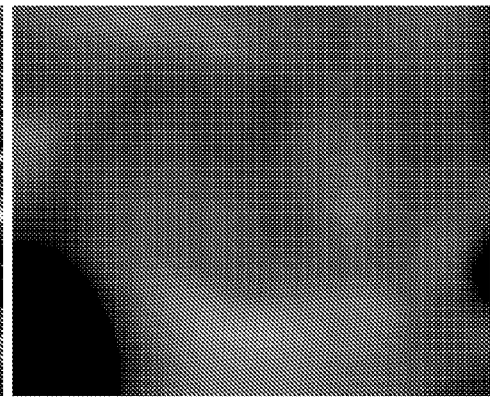
FIG. 19 is a low-frequency mode of the tumor ultrasonic image in FIG. 18 showing tumor heterogeneity.

The low-frequency layer (background) can be used to perform estimation for tumor heterogeneity, as shown in FIG. 18 and 19. FIG. 18 shows an ultrasonic tumor image and FIG. 19 is a low-frequency mode (i.e. background) of the image which shows tumor heterogeneity.

Figure 20:
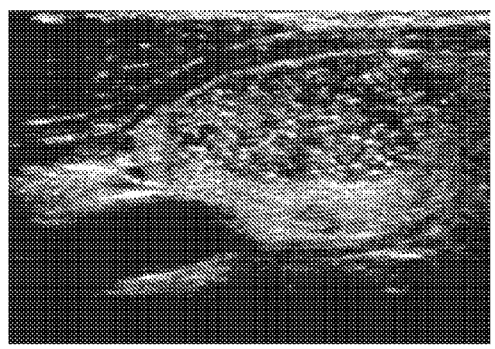
FIG. 20 is an ultrasonic image of a calcification tumor.
Figure 21:
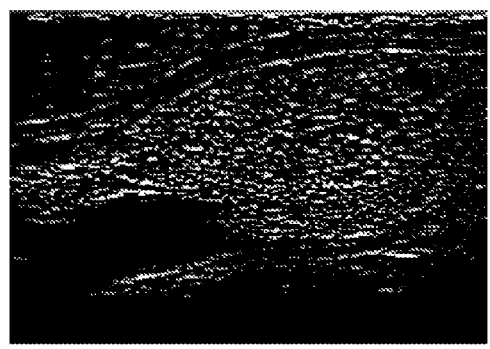
FIG. 21 is a result of subtracting the image of FIG. 20 by the low-frequency mode showing a clear calcification feature.

Besides, by subtracting the low-frequency layer (background) from the original picture, the calcification tissue can be revealed more clearly. FIG. 20 is an ultrasonic image of a calcification tumor, and FIG. 21 shows a clear feature of calcification after removing the low-frequency mode (background).

The above-mentioned third embodiment is applied in a preprocessing process of medical images, especially the ultrasonic medical images which are easily affected by depth compensation and signal attenuation to have an uneven image interference background. The image is divergent data. If the image has poorer resolution in a poorer physical quantity (such as intensity, density or temperature), errors will occur in the mode decomposition. For this reason, the medical images should be checked by a histogram of pixel-brightness. The histogram can be used as a reference for image capturing. The empirical mode decomposition is suitable to be performed when the number of columns (e.g., of the histogram) that indicate that the number of pixels (n) of respective brightness values in a dynamic range is larger than one is higher than a threshold value, e.g. 128.

Figure 4:
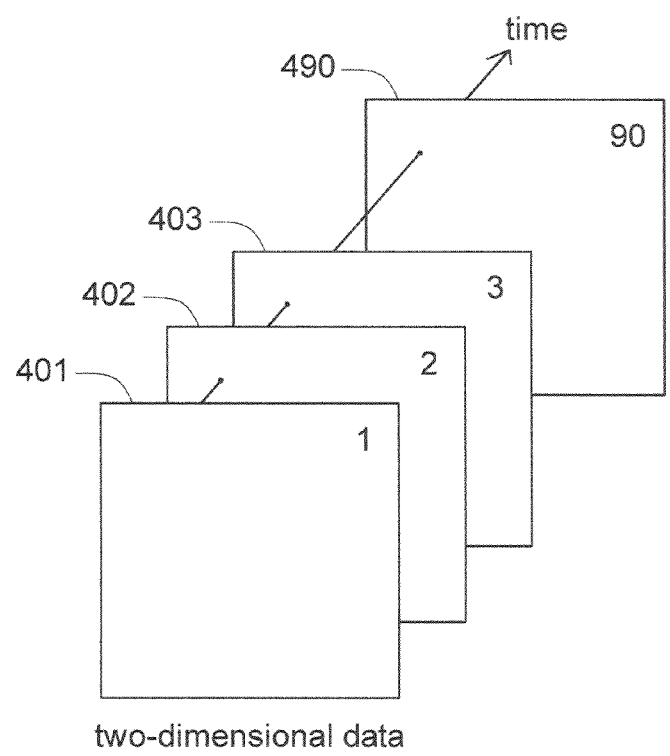
FIG. 4 is a schematic diagram of an analysis structure applying the three-dimensional mode decomposition method to two-dimensional data f(x,y) under a time sequence according to another exemplary embodiment.

Besides, the three-dimensional mode decomposition disclosed by the embodiment can also be applied in the time-frequency analysis of two-dimensional data $f(x,y)$ under a time sequence t as shown in FIG. 4. The images 401 to 490 are two-dimensional data, which imply a moving condition of an object along with time. By extending the time t to a third-dimension coordinate, the above method can be simultaneously applied to space and time mode characteristic decomposition. The method of the embodiment can also be applied to medical image analysis, such as when the observed heart or liver image varies with time. Therefore, the method of the embodiment can also be applied in analysis of more than three-dimensional image data varying with time.

In addition to the example images above, other images from different sources can be appropriate for use in application of the method as exemplified above. For example, the images for decomposition by the method can be derived from water vapor distribution, pressure distribution, temperature distribution or magnetic distribution in the atmosphere or other measurements in different physical environments or phenomena. The different images can be processed by using the decomposition method based on the concept of physical field, as exemplified above, according to their individual characteristics.

An embodiment further discloses a computer-readable data storage medium. The data storage medium stores programs for executing the multi-dimensional empirical mode decomposition of the embodiment. The computer-readable data storage medium can be optical data storage medium or magnetic data storage medium, but is not limited thereto. The optical data storage medium includes CD, DVD, HD-DVD and blue-ray DVD for instance. The magnetic data storage medium includes a soft disc, a hard disc, magnetic disc and magnetic optical disc. Moreover, the computer-readable data storage medium also includes a program code capable of being transmitted on network or a transmission medium (e.g. air).

Another embodiment further discloses a computer program product. When the computer program product is loaded into an electronic device having buffer memory, the electronic device executes a number of program commands for performing the multi-dimensional empirical mode decomposition of the embodiment.

One embodiment further discloses an electronic device, such as a personal computer, a notebook computer, a handheld calculation device, an image capturing device having a data processor, or a medical image device and analyzing device thereof. When the above computer program product is loaded into the electronic device having the buffer memory and data processor, the electronic device executes a number of program commands for performing the multi-dimensional empirical mode decomposition of the embodiment. Further, the electronic device includes a display for displaying the layer to be analyzed. In another example, the electronic device includes an input device for capturing or reading multi-dimensional datasets from outside. In another example, the electronic device includes a user interface for selectively performing a calculation operation or an image processing on the layer to be analyzed to show the texture characteristics.

The embodiments listed above illustrate that by using the field concept and extending to multiple dimensions, the intrinsic mode function decomposition can be performed on multi-dimensional datasets, such as three-dimensional image data or even higher-dimensional datasets. In addition, different applications can be generated such as analyzing image difference and characteristics from viewpoint of empirical mode images and accordingly making diagnosis and analysis. As mentioned above, by applying the image empirical mode function, a number of important texture characteristics inside the tumor can be effectively described and thus the liver fibrosis can be found at the beginning by objectively quantitative analysis.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method for processing multi-dimensional data by empirical mode decomposition (EMD), comprising:
   reading a first set of multi-dimensional data; and
   sifting the first set of multi-dimensional data by iteration to obtain at least an intrinsic mode function via empirical mode decomposition, wherein the sifting step includes an iteration process for obtaining the intrinsic mode function comprising:
   mapping each value of the first set of the multi-dimensional data to a physical quantity of a physical field, described by a governing differential equation, to obtain a plurality of numerical values of the physical quantity, wherein the physical quantity has the same dimension as the first set of multi-dimensional data;
   determining an average envelope of a distribution of the numerical values of the physical quantity according to a varying relationship of the physical field with respect to the physical quantity;
   determining a next set of multi-dimensional data according to the first set of multi-dimensional data and the average envelope comprising:
   inversely mapping the average envelope in terms of the physical quantity to numeral values; and
   determining the next set of multi-dimensional data to be difference values between the first set of multi-dimensional data and the numerical values obtained by inversely mapping the average envelope; and
   performing a next iteration process starting with the mapping step with respect to the next set of multi-dimensional data.

2. The method according to claim 1, wherein in the mapping step, each value of the first set of multi-dimensional data is linearly mapped to the numerical values of the physical quantity of the physical field.

3. The method according to claim 1, wherein the physical field is a thermal field and the physical quantity is a temperature of the thermal field.

4. The method according to claim 3, wherein the varying relationship of the physical field with respect to the physical quantity is a thermal-field equation indicating a spatial distribution of temperature of the thermal field.

5. The method according to claim 1, wherein the iteration process of the sifting step further comprises:
   determining whether the next set of multi-dimensional data can be regarded as an intrinsic mode function by determining whether the average envelope is indicative of an insignificant variation.

6. The method according to claim 1, wherein the next set of multi-dimensional data are indicative of a component signal of the first set of multi-dimensional data, and the sifting step with the sub-steps is performed by iterations until the successive component signals are substantially the same.

7. The method according to claim 1, wherein the step of determining the average envelope comprises:
   determining an upper envelope and a lower envelope corresponding to the first set of multi-dimensional data according to the varying relationship of the physical field with respect to the physical quantity; and
   determining the average envelope according to the upper envelope and the lower envelope.

8. The method according to claim 7, wherein the upper envelope is a first distribution of the physical quantity corresponding to maximum values of the first set of multi-dimensional data, and the lower envelope is a second distribution of the physical quantity corresponding to minimum values of the first set of multi-dimensional data.

9. The method according to claim 8, wherein the average envelope is an average of the upper envelope and the lower envelope.

10. The method according to claim 1, wherein the first set of multi-dimensional data are three-dimensional image data.

11. The method according to claim 1, wherein the first set of multi-dimensional data are two-dimensional image data with respect to a time sequence.

12. A non-transitory computer readable medium having stored therein program code, for performing a multi-dimensional data processing method by empirical mode decomposition in an electronic device comprising a buffer memory, wherein when the program code is loaded into the electronic device and executed, the method according to claim 1 is performed.

13. A method for processing multi-dimensional image data by empirical mode decomposition, applied for image texture analysis, the method comprising:
   (a) reading a first set of multi-dimensional image data;
   (b) sifting the first set of multi-dimensional image data by iteration to obtain a plurality of intrinsic mode functions via empirical mode decomposition, wherein an iteration process of the sifting step for obtaining one of the intrinsic mode functions comprises:
   mapping each value of the first set of the multi-dimensional data to a physical quantity of a physical field to obtain a plurality of numerical values of the physical quantity, wherein the physical quantity has the same dimension as the first set of multi-dimensional image data and is a function of time;
   determining an average envelope of distribution of the numerical values of the physical quantity according to a varying relationship of the physical field with respect to the physical quantity;
   determining a next set of multi-dimensional image data according to the first set of multi-dimensional image data and the average envelope; and
   performing a next iteration process beginning with the mapping step according to the next set of multi-dimensional image data; and
   (c) transforming the intrinsic mode functions to be a plurality of multi-dimensional images and outputting the multi-dimensional images for the image texture analysis.

14. The method according to claim 13, wherein in the mapping step, each value of the first set of multi-dimensional image data is linearly mapped to the physical quantity of the physical field to obtain the numerical values of the physical quantity of the physical field.

15. The method according to claim 13, wherein the physical field is a thermal field and the physical quantity is a temperature of the thermal field.

16. The method according to claim 15, wherein the varying relationship of the physical field with respect to the physical quantity is a thermal-field equation indicating a spatial distribution of temperature of the thermal field.

17. The method according to claim 13, wherein each iteration process in the sifting step further comprises:
determining whether the next set of multi-dimensional image data can be regarded as an intrinsic mode function.

18. The method according to claim 13, wherein the next set of multi-dimensional image data are a component signal of the first set of multi-dimensional image data, and the sub-steps in the sifting step are performed by iteration until successive component signals are substantially equal.

19. The method according to claim 13, wherein the step of determining the average envelope comprises:
determining an upper envelope and a lower envelope corresponding to the first set of multi-dimensional image data according to the varying relationship of the physical field with respect to the physical quantity of the physical field; and
determining the average envelope according to the upper envelope and the lower envelope.

20. The method according to claim 19, wherein the upper envelope is a first distribution of the physical quantity corresponding to maximum values of the first set of multi-dimensional image data, and the lower envelope is a second distribution of the physical quantity corresponding to minimum values of the first set of multi-dimensional image data.

21. The method according to claim 20, wherein the average envelope is an average of the upper envelope and the lower envelope.

22. The method according to claim 13, wherein the step of determining the next set of multi-dimensional image data comprises:
inversely mapping the average envelope in terms of the physical quantity to numeral values; and
determining the next set of multi-dimensional image data to be difference values between the first set of multi-dimensional image data and the numerical values obtained by inversely mapping the average envelope.

23. The method according to claim 13, wherein the multi-dimensional images are further processed by smoothing.

24. The method according to claim 13, further comprising:
selectively performing an image processing according to at least one of the multi-dimensional images.

25. The method according to claim 13, further comprising:
generating a histogram based on the first set of multi-dimensional image data, determining whether a dynamic range of the first set of multi-dimensional image data matches a threshold value and accordingly determining whether the multi-dimensional image data are suitable to perform the sifting step.

26. The method according to claim 13, wherein the first set of multi-dimensional image data represent an ultrasonic image, a CT image or a 4D ultrasonic image.

27. The method according to claim 13, wherein the first set of multi-dimensional image data are two-dimensional image data with respect to a time sequence.

28. The method according to claim 13, wherein the first set of multi-dimensional image data represent a tumor image, and the multi-dimensional images represent different layers of the tumor image used for tumor image analysis.

29. The method according to claim 28, for use in analysis and auxiliary diagnosis of heterogeneity, micro calcification or fibrosis characteristics.

30. A non-transitory computer readable medium having stored therein program code, for performing a multi-dimensional data processing method by empirical mode decomposition according to claim 13 in an electronic device comprising a buffer memory, wherein when the program code is loaded into the electronic device and executed, the method according to claim 14 is performed.

* * * * *